United States Patent [19]
Adkins

[11] Patent Number: 5,143,122
[45] Date of Patent: Sep. 1, 1992

[54] COMPOSITE FLEXIBLE CONDUIT ASSEMBLY

[75] Inventor: Delbert L. Adkins, Mount Clemens, Mich.

[73] Assignee: Bundy Corporation, Warren, Mich.

[21] Appl. No.: 580,488

[22] Filed: Sep. 11, 1990

[51] Int. Cl.⁵ ............................................. F16L 39/02
[52] U.S. Cl. .................... 138/109; 138/103; 138/122; 361/215; 285/149; 174/47
[58] Field of Search ............... 138/103, 104, 109, 124, 138/122, 125, 126, 127, 178; 361/215; 285/149, 239, 381; 174/47

[56] References Cited

U.S. PATENT DOCUMENTS

| | | | |
|---|---|---|---|
| 986,081 | 3/1911 | Patterson | 285/381 |
| 1,996,855 | 4/1935 | Cheswright | 285/239 |
| 4,477,108 | 10/1984 | Castelbaum et al. | 285/149 |

FOREIGN PATENT DOCUMENTS

| | | | |
|---|---|---|---|
| 257158 | 4/1964 | Netherlands | 138/109 |
| 96726 | 9/1960 | Norway | 285/149 |
| 773033 | 4/1957 | United Kingdom | 285/239 |
| 1062991 | 3/1967 | United Kingdom | 285/149 |

*Primary Examiner*—James E. Bryant, III
*Attorney, Agent, or Firm*—Barnes, Kisselle, Raisch, Choate, Whittemore & Hulbert

[57] ABSTRACT

A flexible conduit having a flexible inner tube of a polymer material, a flexible coil of wire received over said inner tube, a flexible outer jacket shrunk onto the coil, and couplings inserted into the ends of both the outer jacket and inner tube. Preferably, the outer jacket is attached to both the coil and the couplings by an adhesive. Preferably, the conduit is made by extruding the inner tube, wrapping the coil of wire around the tube as it is being extruded, telescoping the outer jacket over the coil and tube, inserting the couplings, and heating the outer jacket to shrink it into firm engagement with the coil and to initiate curing of the adhesive on the interior of the outer jacket.

37 Claims, 2 Drawing Sheets

COMPOSITE FLEXIBLE CONDUIT ASSEMBLY

This invention relates to conduits and more particularly to a flexible composite conduit assembly and a method of making it.

BACKGROUND

Many automotive gas line, brake line and power steering line applications provide a hostile environment for flexible conduits. These flexible conduits need to be crush resistant, impact or crash resistant, abrasion resistant, shear resistant, vibration resistant, function in an exterior atmosphere at elevated temperatures up to 275° F. and in some applications up to 450° F. and frequently provide noise insulation or isolation. These flexible conduits also need to be corrosion resistant both to hostile exterior weather and atmospheric conditions and to interior chemical attack by power steering fluid, brake fluid, gasoline, methanol fuel, and formic acid, water and other contaminants in gasoline and methanol fuel. Flexible conduits for power steering and brake lines also require great burst strength. Conventional rubber hoses and nylon tubes have serious shortcomings for these automotive fuel, power steering and brake line applications.

SUMMARY

A composite flexible conduit assembly or system having a flexible inner tube of a polymer material connected at its ends to couplings or fittings, a wound wire coil armor over the inner tube, and an outer tubular jacket of a flexible polymer material heat shrunk over the wire coil and portions of the couplings or fittings. Preferably, the outer jacket is also secured by an adhesive to the armor wire and couplings or end fittings. To provide thermal and noise insulation and reduced permeability, preferably there is a dead air space between the inner tube and outer jacket.

Where a grounded or electrically conductive flexible conduit is desired, the interior of the inner tube can have a carbon doped inner liner and the couplings can be of an electrically conductive metal.

Preferably, the flexible conduit is made by extruding an inner tube, winding the wire coil around the tube as it is being extruded and then cutting the tube and wire coil sub-assembly to the desired length. The outer jacket is cut to a predetermined length and telescoped over the wire coil and the couplings or fittings connected or inserted into the ends of the inner tube and jacket. Preferably, an adhesive of the heat activated type is applied to the interior of the jacket before it is telescoped over the wire coil. Thereafter the assembly is heated to an elevated temperature to cause the jacket to shrink into firm engagement with the wire coil and the couplings and to initiate curing of the adhesive.

Objects, features and advantages of this invention are to provide a flexible conduit assembly or system which has great impact resistance, crush resistance, crash resistance, abrasion resistance, vibration resistance, corrosion-resistance, good thermal and noise insulating properties, good shear strength, is highly flexible, usable in elevated exterior temperature applications, can be bent with a relatively sharp radius without kinking or collapsing the inner tube, and is of relatively simplified design and economical manufacture and assembly.

BRIEF DESCRIPTION OF THE DRAWINGS

These and other objects, features and advantages of this invention will be apparent from the following detailed description, appended claims and accompanying drawings in which:

Figure 6:
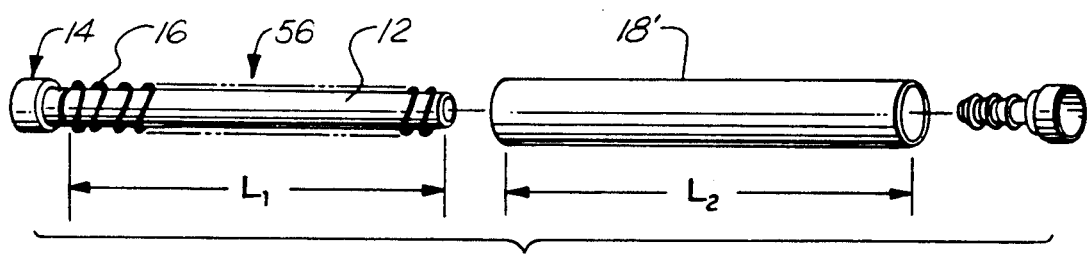
Figure 7:
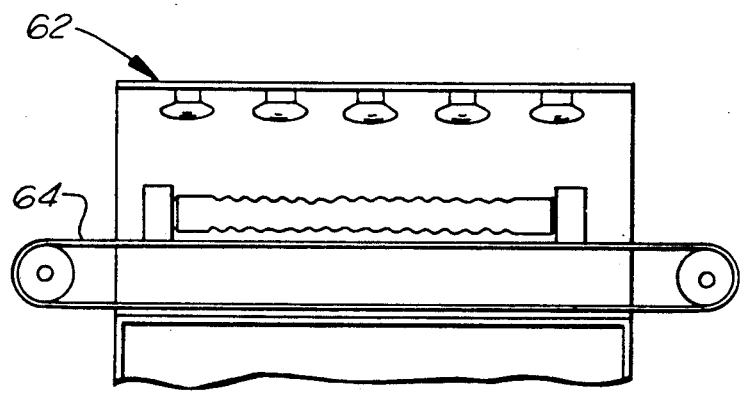

IF. 5 is a semi-schematic view illustrating the steps of the preferred method of making the conduit of extruding the inner tube, winding the wire coil and cutting the resulting sub-assembly;

FIG. 6 is a semi-diagrammatic view illustrating the steps of the method of assembling the jacket over the wire armor and inserting the couplings into the inner tube and outer jacket; and FIG. 7 is a semi-diagrammatic view illustrating the step of the method of heating the assembly to an elevated temperature for an appropriate period of time to shrink the outer jacket into firm engagement with the wire coil and the connectors.

DETAILED DESCRIPTION

Figure 1:
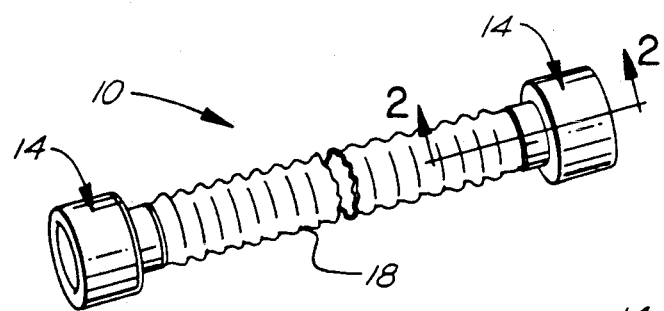
FIG. 1 is a perspective view of a flexible conduit assembly embodying this invention.
Figure 2:
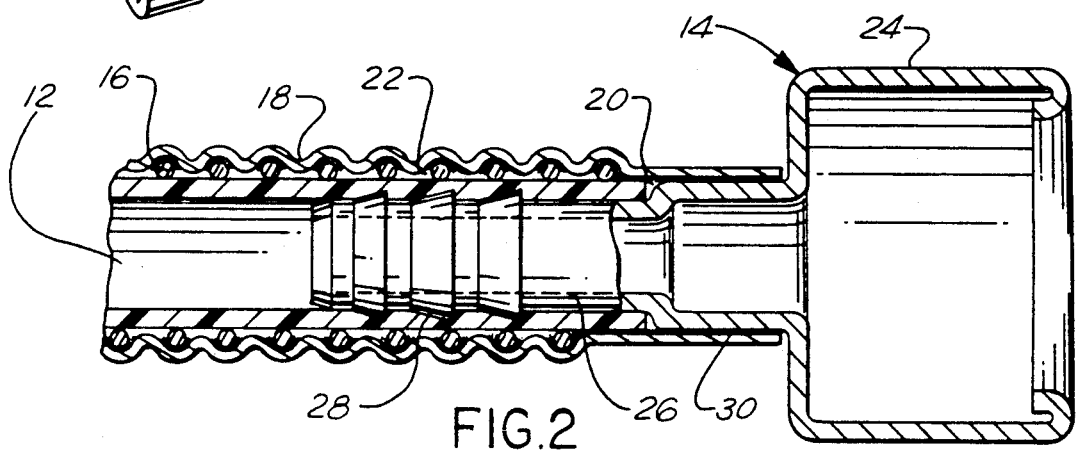
FIG. 2 is a fragmentary sectional view taken on line 2—2 of FIG. 1 and illustrating a coupling of the assembly.

Referring in more detail to the drawings, FIGS. 1 and 2 illustrate a flexible conduit assembly or system 10 embodying this invention. To convey a fluid, the conduit has a flexible inner tube 12 connected at its ends to a pair of couplings 14, rigid metal tubes or other fittings. To protect the inner tube and enhance its ability to flex without kinking, a wire coil 16 or armor is received over the tube. To protect the wire coil from corrosion, a flexible tubular jacket 18 is received over the wire coil and sealed to the couplings, preferably by an adhesive 20. To enhance the ability to flex the conduit without kinking, the jacket 18 is shrunk onto the wire coil so that it extends partially into the space between adjacent loops of the wire. Preferably, to further enhance flexing without kinking, the outer jacket is also adhered by the adhesive 20 to the wire coil.

To provide thermal and noise insulation and reduce permeation of fluid through the conduit, preferably the wire coil cooperates with the outer jacket to form a dead air space 22 between the jacket and the inner tube. The hoop or burst strength of the conduit is also enhanced by the wire coil and the outer jacket.

Any buildup of static electricity due to fluid flowing through the conduit will not be discharged through the inner tube, which would burn holes therein and destroy it, because the inner tube and jacket electrically insulate, isolate, and shield the wire coil so that it cannot be grounded.

For fuel lines and other relatively low fluid pressure applications, the couplings 14 can be of the push-in type, as shown in FIG. 2. Preferably, each coupling has a one piece body of metal with a connector collar 24 and an integral barrel 26 with a series of spaced apart and tapered or barbed rings 28 on its outer periphery adjacent its free end. In assembly, the barrel is inserted into an end of both the outer jacket and the inner tube so that the barbed rings 28 firmly engage the inner tube to retain the barrel therein. To both provide a seal and further secure the coupling, preferably the outer jacket is attached by the adhesive to a cylinder portion 30 of the barrel.

Figure 3:
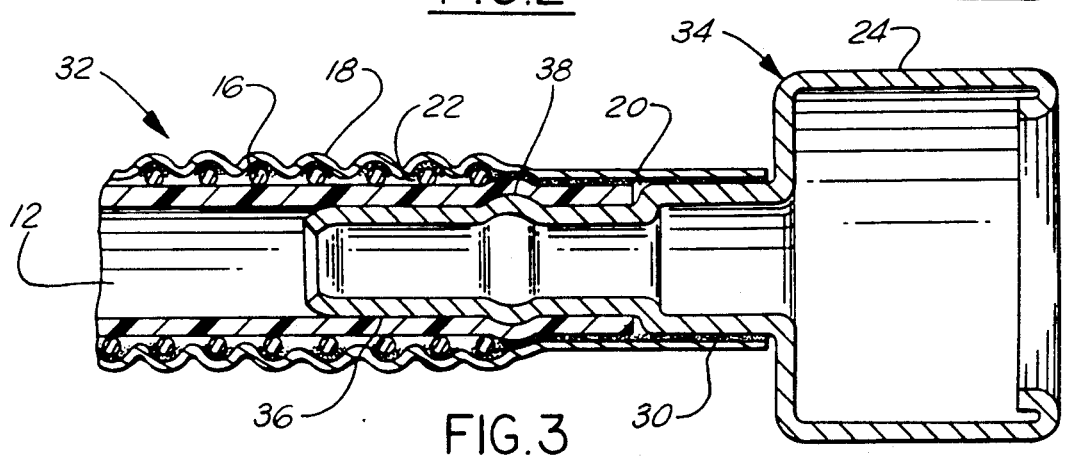
FIG. 3 is a fragmentary sectional view similar to FIG. 2 illustrating a modified coupling.

FIG. 3 illustrates a flexible conduit 32 with modified push-in type couplings 34. The coupling has a one-piece metal body with a connector collar 24 and an internal barrel 36 with a bulbous ring 38 spaced from the free end of the barrel. The maximum diameter of the ring 38 is greater than the inside diameter of the tube 12. In assembly, the barrel is inserted into an end of both the outer jacket and the inner tube and retained therein by firm frictional engagement with the inner tube and preferably an adhesive 20 attaching of the outer jacket to the cylindrical portion 30 of the barrel. As the barrel is inserted into the inner tube, the free end of the wire coil is advanced axially on the tube, by advancing axial movement of the bulbous ring 38, so that when assembled the wire coil does not pass over the bulbous ring. It has been found in practice that trying to expand the wire radially outwardly and force it axially over the bulbous portion forms grooves in the inner tube which tend to decrease the strength and vibration and fatigue resistance of the coupling. This conduit 32 is believed to have greater fatigue and vibration resistance than the conduit 10 because the coupling does not have any sharp edges or portions which dig into the inner tube.

Figure 4:
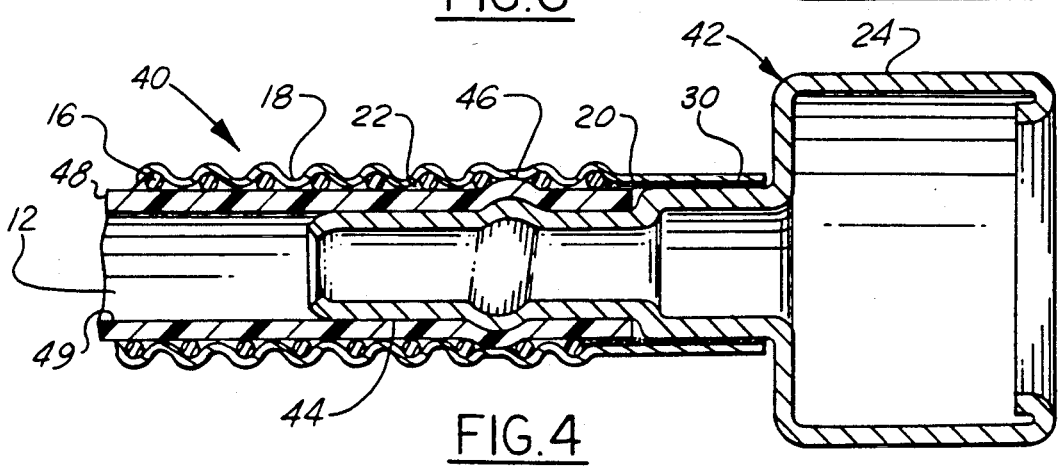
FIG. 4 is a fragmentary sectional view similar to FIG. 2 illustrating another modified coupling.

FIG. 4 illustrates a conduit 40 with modified couplings 42 which are threaded into the inner tube. The coupling has a one piece metal body with a connector collar 24 and an integral barrel 44 with one or more bulbous rings 46 each having a pitch complementary to the pitch of the wire coil so that in assembly each bulbous ring is received between two adjacent turns of the wire. The barrel 44 is inserted into the end of the inner tube 12 by rotating and axially advancing it so that the bulbous ring 46 threads into the tube between adjacent turns of the wire coil. This allows the barrel to be inserted without significantly radially expanding the wire armor and thereby avoids forming sharp grooves in the inner tube which would tend to weaken it. This conduit 40 is believed to have greater coupling pull-out resistance or strength than conduits 14 and 32 because the wire coil cooperates with the bulbous ring to retain the barrel in the inner tube.

In some applications, the connector collar 24 may be eliminated and the barrel 26, 36, or 40 formed as an integral part at one end of a metal tube which is inserted into the inner tube 12 and outer jacket 18. For example, the barrel 26 could be formed at one end of a metal rigid fuel line and inserted into the tube 12 and jacket 18 to provide a fuel conduit system with both a rigid metal tube section and a flexible conduit section embodying this invention.

For applications where it is desired to provide a grounded or electrically conductive flexible conduit, as shown in FIG. 4, the interior of the inner tube 12 can be carbon lined, such as by co-extrusion of nylon 48 with a carbon doped inner liner 49 or core and using metal couplings 42 which are electrically conductive.

For applications where the maximum temperature of the exterior atmosphere does not exceed about 275° F., preferably the inner tube is of a nylon 12 polymer and the outer jacket is a polyolefin polymer. For applications having a maximum exterior temperature of up to about 350° F., suitable inner tube and/or outer jacket polymers are polyvinylidene fluoride (PVDF) commercially sold under the trademark "KYNAR" by Penwalt Corp. of Philadelphia, Pa., and radiation cross linked Nylon available from the Raychem Corporation of Menlo Park, Calif. For applications with an exterior atmosphere having a maximum temperature of up to 450° F., suitable polymers for the inner tube and/or jacket are polytetrafluoroethylene (PTFE) or fluorinated ethylene propylene copolymer (FEP) commercially available under the trademark "TEFLON" by DuPont Corp., Wilmington, Del., silicone and the like.

Preferably, the coil 16 is a spiral wound wire of low or high carbon steel, which is preferably aluminum coated to enhance its corrosion resistance. Because the wound wire is sealed between the outer jacket and inner tube, it does not have to be made of a highly corrosion resistant material, such as stainless steel. Typically corrosion resistant material, such as stainless steel. Typically, the inner tube has a wall thickness of about 0.020 to 0060 of an inch, the outer jacket before being shrunk has a thickness of about 0.025 to 0.045 of an inch and the wire of the coil has a diameter of about 0.020 to 0.050 of an inch.

Figure 5:
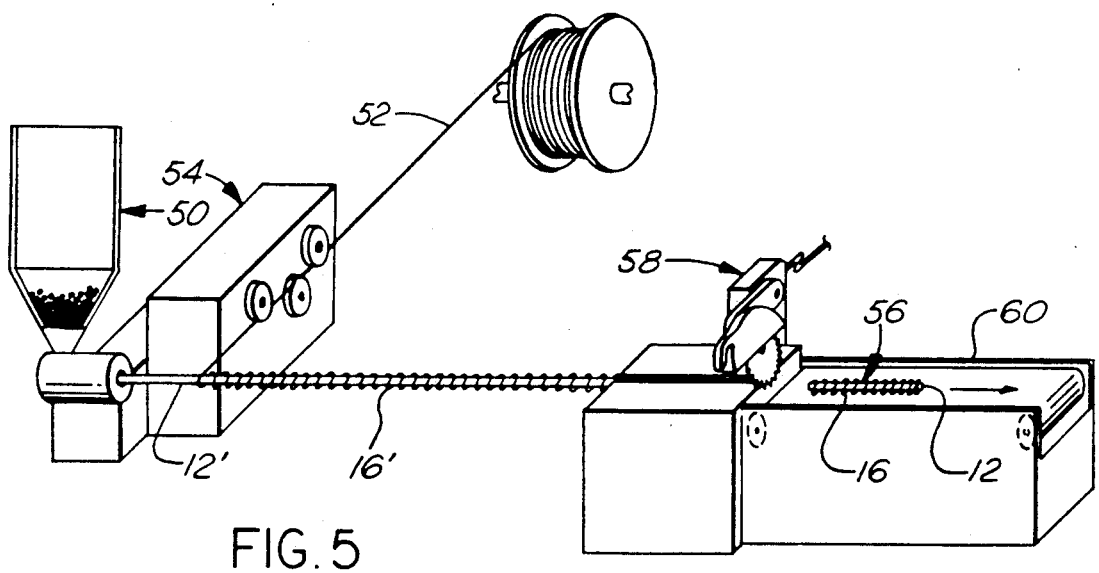

Preferably, the flexible conduit assembly is made by the method illustrated semi-diagrammatically in FIGS. 5-7. Preferably, an inner tube 12' is extruded substantially continuously by an extruder 50 or a plastic molding machine and appropriate dies. Preferably, but not necessarily, as the tube 12' emerges from the extruder, a wire 52 is wound around it by a wire winding machine 54 to form a helical coil 16'. Thereafter, the tube and wound wire is cut into a plurality of sub-assemblies 56 each of a predetermined length, such by a traveling cut-off saw 58, and carried away by a conveyor 60.

Outer jacket tubes 18' are also cut to a predetermined appropriate length. The outer jacket tube is somewhat longer than the tinner tube ($L_2 > L_1$) so that the ends of the jacket tube will overlap and can be secured to the barrels of the couplings beyond the inner tube. Preferably, the entire inner surface of the outer jacket tube 18' is coated with an adhesive 20 which is preferably of the type which is activated to cure by being heated to an elevated temperature.

As shown in FIG. 6, usually the outer jacket tube 18' cannot pass over the collar 24 of the coupling 14. Therefore, one coupling 14 is inserted into one end of the inner tube of the sub-assembly 56, the outer jacket is telescoped over the coil 16 and onto the cylindrical portion 30 of the coupling. Thereafter, the other coupling is inserted into the other end of both the outer jacket and inner tube. If the outer jacket is not pre-coated with adhesive, then an adhesive preferably of the heat activated type is applied to the cylindrical portion of the barrels of the couplings before they are inserted into the jacket. If desired, an adhesive can be applied to the entire barrel to also adhere the inner tube to the connectors.

As shown in FIG. 7, the outer jacket tube 18' is shrunk into firm engagement with the wire coil by heating it, preferably with infrared energy in an electric or gas infrared oven 62 through which the assembly is moved by a conveyor 64. For a jacket tube 18' of polyolefin, heating it to a surface temperature of about 350° for three to five minutes, usually is sufficient to form and fully shrink the jacket 18 onto the wire coil 16 and the couplings. This heating also activates the adhesive 20 so it will cure to firmly adhere the jacket 18 to the coil wire and the couplings.

I claim:

1. A flexible conduit comprising a flexible and elongate inner tube of a polymer material, a flexible and elongate coil of wire having a plurality of loops telescopically received over said inner tube, a flexible and elongate tubular outer jacket of a polymer material telescoped over said coil, a pair of couplings each received in one end of said outer jacket and inner tube, each of said couplings and said inner tube having a fluid tight seal therebetween so that a fluid under pressure may be retained in said inner tube and couplings, a seal between each coupling and said outer jacket, said outer jacket is a heat shrinkable polymer material and is shrunk into firm engagement with said coil of wire throughout the length of said coil, and said outer jacket and inner tube cooperate to define a dead air space between them in which said coil is received and encapsulated between them, and said coil adjacent each end overlapping in part one of said couplings and being isolated from direct contact therewith by said inner tube.

2. The conduit of claim 1 which also comprises an adhesive attaching said outer jacket to said coil of wire.

3. The conduit of claim 1 wherein said outer jacket is of a heat shrinkable polymer material and is shrunk into firm engagement with said coil of wire.

4. The conduit of claim 1 wherein the axial length of said outer jacket is greater than the axial length of said inner tube and each coupling is secured by an adhesive to said outer jacket in an area axially beyond the end of said inner tube.

5. The conduit of claim 4 wherein the axial length of said inner tube is greater than the axial length of said coil of wire so that said inner tube extends generally axially beyond the ends of said coil of wire.

6. The conduit of claim 1 wherein the polymer of said inner tube is one of nylon, PTFE, PVDF, FEP and silicone polymers.

7. The conduit of claim 1 wherein each coupling has a barrel received in one end of said outer jacket and said inner tube with an end portion of said inner tube and said coil overlapping a first portion of said barrel and an end portion of said outer jacket overlapping both said first portion and a second portion of said barrel adjacent to said first portion of said barrel.

8. The conduit of claim 1 wherein said couplings are of an electrically conductive material and said inner tube has a carbon lining and said carbon lining is electrically connected to both of said couplings.

9. The conduit of claim 1 wherein said inner tube extends axially beyond the ends of said coil of wire, said outer jacket extends axially beyond the ends of said inner tube, and said second portion of each barrel has a maximum outside diameter larger than the minimum outside diameter of said first portion of said barrel.

10. A flexible conduit comprising a flexible and elongate inner tube of a polymer material, a flexible and elongate coil of wire having a plurality of loops telescopically received over said inner tube, a flexible and elongate tubular outer jacket of a polymer material telescoped over said coil, a pair of couplings each having a barrel received in one end of said outer jacket and said inner tube with an end portion of said inner tube and said coil overlapping a first portion of said barrel and an end portion of said outer jacket overlapping both said first portion and a second portion of said barrel adjacent to said first portion of said barrel, said first portion of said barrel of at least one of said couplings has a plurality of annular rings axially spaced apart thereon and each having a tapered cross section constructed and arranged to firmly engage said inner tube to resist removal of said barrel therefrom, each of said coupling and said inner tube having a fluid tight seal therebetween so that a fluid under pressure may be retained in said inner tube and couplings, a seal between each coupling and said outer jacket, and said outer jacket and inner tube cooperating to define a dead air space between them in which said coil is received, and said coil adjacent each end overlapping in part one of said couplings and being isolated from direct contact therewith by said inner tube.

11. The conduit of claim 10 which also comprises an adhesive sealing and attaching each coupling to said outer jacket.

12. The conduit of claim 10 which also comprises an adhesive attaching said outer jacket to said coil of wire.

13. The conduit of claim 10 wherein said outer jacket is of a heat shrinkable polymer material and is shrunk into firm engagement with said coil of wire.

14. The conduit of claim 10 wherein the axial length of said outer jacket is greater than the axial length of said inner tube and each coupling is secured by an adhesive to said outer jacket in an area axially beyond the end of said inner tube.

15. The conduit of claim 10 wherein the axial length of said inner tube is greater than the axial length of said coil of wire so that said inner tube extends generally axially beyond the ends of said coil of wire.

16. The conduit of claim 10 wherein the polymer of said inner tube is one of nylon, PTFE, PVDF, FEP and silicone polymers.

17. The conduit of claim 10 wherein said couplings are of an electrically conductive material and said inner tube has a carbon lining and said carbon lining is electrically connected to both of said couplings.

18. The conduit of claim 10 wherein said inner tube extends axially beyond the ends of said coil of wire, said outer jacket extends axially beyond the ends of said inner tube, and said second portion of each barrel has a maximum outside diameter larger than the minimum outside diameter of said first portion of said barrel.

19. A flexible conduit comprising a flexible and elongate inner tube of a polymer material, a flexible and elongate coil of wire having a plurality of loops telescopically received over said inner tube, a flexible and elongate tubular outer jacket of a polymer material telescoped over said coil, a pair of couplings having a barrel received in one end of said outer jacket and said inner tube with an end portion of said inner tube and said coil overlapping a first portion of said barrel and an end portion of said outer jacket overlapping both said first portion and a second portion of said barrel adjacent to said first portion of said barrel, said barrel of at least one of said couplings has a bulbous ring thereon having a maximum diameter greater than the inside diameter of said inner tube and is received in said inner tube to resist removal of said barrel therefrom, an end of said coil is immediately adjacent said bulbous ring and said coil does not extend over and beyond said bulbous ring, each of said couplings and said inner tube having a fluid tight seal therebetween so that a fluid under pressure may be retained in said inner tube and couplings, a seal between each coupling and said outer jacket, and said outer jacket and inner tube cooperating to define a dead air space between them in which said coil is received, and said coil adjacent each end overlapping in part one of said couplings and being isolated from direct contact therewith by said inner tube.

20. The conduit of claim 19 which also comprises an adhesive sealing and attaching each coupling to said outer jacket.

21. The conduit of claim 19 which also comprises an adhesive attaching said outer jacket to said coil of wire.

22. The conduit of claim 19 wherein said outer jacket is of a heat shrinkable polymer material and is shrunk into firm engagement with said coil of wire.

23. The conduit of claim 19 wherein the axial length of said outer jacket is greater than the axial length of said inner tube and each coupling is secured by an adhesive to said outer jacket in an area axially beyond the end of said inner tube.

24. The conduit of claim 19 wherein the axial length of said inner tube is greater than the axial length of said coil of wire so that said inner tube extends generally axially beyond the ends of said coil of wire.

25. The conduit of claim 19 wherein the polymer of said inner tube is one of nylon, PTFE, PVDF, FEP and silicone polymers.

26. The conduit of claim 19 wherein said couplings are of an electrically conductive material and said inner tube has a carbon lining and said carbon lining is electrically connected to both of said couplings.

27. The conduit of claim 19 wherein said inner tube extends axially beyond the ends of said coil of wire, said outer jacket extends axially beyond the ends of said inner tube, and said second portion of each barrel has a maximum outside diameter larger than the minimum outside diameter of said first portion of said barrel.

28. A flexible conduit comprising a flexible and elongate inner tube of a polymer material, a flexible and elongate coil of wire having a plurality of loops telescopically received over said inner tube, a flexible and elongate tubular outer jacket of a polymer material telescoped over said coil, a pair of couplings having a barrel received in one end of said outer jacket and said inner tube with an end portion of said inner tube and said coil overlapping a first portion of said barrel and an end portion of said outer jacket overlapping both said first portion and a second portion of said barrel adjacent to said first portion of said barrel, said first portion of said barrel of at least one of said couplings has at least one bulbous annulus with a maximum outside diameter greater than the inside diameter of said inner tube, said bulbous annulus having a pitch which corresponds substantially to the pitch of said loops of wire of said coil, and said bulbous annulus is substantially in line with the space between two adjacent loops of wire of said coil to restrain removal of its associated barrel from said inner tube, each of said couplings and said inner tube having a fluid tight seal therebetween so that a fluid under pressure may be retained in said inner tube and couplings, a seal between each coupling and said outer jacket, and said outer jacket and inner tube cooperating to define a dead air space between them in which said coil is received, and said coil adjacent each end overlapping in part one of said couplings and being isolated from direct contact therewith by said inner tube.

29. The conduit of claim 28 which also comprises an adhesive securing and sealing said outer jacket to said second portion of said barrel having said bulbous annulus in said first portion thereof.

30. The conduit of claim 28 which also comprises an adhesive sealing and attaching each coupling to said outer jacket.

31. The conduit of claim 28 which also comprises an adhesive attaching said outer jacket to said coil of wire.

32. The conduit of claim 28 wherein said outer jacket is of a heat shrinkable polymer material and is shrunk into firm engagement with said coil of wire.

33. The conduit of claim 28 wherein the axial length of said outer jacket is greater than the axial length of said inner tube and each coupling is secured by an adhesive to said outer jacket in an area axially beyond the end of said inner tube.

34. The conduit of claim 28 wherein the axial length of said inner tube is greater than the axial length of said coil of wire so that said inner tube extends generally axially beyond the ends of said coil of wire.

35. The conduit of claim 28 wherein the polymer of said inner tube is one of nylon, PTFE, PVDF, FEP and silicone polymers.

36. The conduit of claim 28 wherein said couplings are of an electrically conductive material and said inner tube has a carbon lining and said carbon lining is electrically connected to both of said couplings.

37. The conduit of claim 28 wherein said inner tube extends axially beyond the ends of said coil of wire, said outer jacket extends axially beyond the ends of said inner tube, and said second portion of each barrel has a maximum outside diameter larger than the minimum outside diameter of said first portion of said barrel.

* * * * *